(12) United States Patent
Song et al.

(10) Patent No.: US 7,315,337 B2
(45) Date of Patent: Jan. 1, 2008

(54) LIQUID CRYSTAL DISPLAY

(75) Inventors: Sung Hun Song, Kyoungki-do (KR); Suk Man Yang, Seoul (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 395 days.

(21) Appl. No.: 11/152,461

(22) Filed: Jun. 14, 2005

(65) Prior Publication Data

US 2006/0114387 A1 Jun. 1, 2006

(30) Foreign Application Priority Data

Nov. 30, 2004 (KR) ............... 10-2004-0099198

(51) Int. Cl.
 *G02F 1/1335* (2006.01)
(52) U.S. Cl. .................................................. 349/96
(58) Field of Classification Search .............. 349/96
 See application file for complete search history.

(56) References Cited

U.S. PATENT DOCUMENTS

2002/0051106 A1* 5/2002 Nagashima et al. ........ 349/110
2007/0030439 A1* 2/2007 Kinoshita et al. ........... 349/158

\* cited by examiner

*Primary Examiner*—James A. Dudek
(74) *Attorney, Agent, or Firm*—Seyfarth Shaw LLP

(57) ABSTRACT

Disclosed is a liquid crystal display capable of improving the bending phenomenon of a liquid crystal panel. The liquid crystal display includes a liquid crystal panel having upper and lower substrates bonded each other with a liquid crystal layer interposed between them; an upper polarization plate attached to the upper surface of the upper substrate; and a lower polarization plate attached to the lower surface of the lower substrate. The upper and lower polarization plates have adhesion layers, respectively, which have different adhesion forces depending on the bending direction of the liquid crystal panel.

8 Claims, 5 Drawing Sheets

LIQUID CRYSTAL DISPLAY

BACKGROUND OF THE INVENTION

1. Field of the Invention

The present invention relates to a liquid crystal display, and more particularly to a liquid crystal display capable of improving the bending phenomenon of the liquid crystal panel.

2. Description of the Prior Art

A liquid crystal display is one of image display devices and has the advantages of lightness, flatness, and compactness, as well as low power consumption, compared with a CRT, which is a typical image display device. Unlike the CRT, the liquid crystal display cannot generate light by itself and needs a light source in addition to a liquid crystal panel. A fluorescent lamp is usually used as the light source of the liquid crystal display. Upper and lower polarization plates are attached to the upper and lower surfaces of the liquid crystal panel of the liquid crystal display, respectively, to interrupt or transmit light from a lamp.

FIG. 1 is a perspective view showing the structure of a polarization plate according to the prior art.

The polarization plate 16 according to the prior art has an adhesion layer 11, a first TAC (triacetylcelluose) film 12, a PVA (polyvinylalconol) film 13, a second TAC film 14, and a mold-release film 15 successively laminated. The PAV film 13 is elongated in a predetermined direction and is dyed with a pigment having two colors. The first and second TAC films 12 and 14 are attached to both surfaces of the PVA film 13, respectively. The adhesion layer 11 is made of a high-molecular material having adhesion force so that the polarization plate 16 is attached to an upper or lower substrate (not shown). The adhesion layer 11 has the same adhesion force to both upper and lower substrates. Reference numeral 10 refers to an adhesion protective film.

Such a conventional polarization plate 16 having an elongated film, such as the PVA film 13, however, bends in a predetermined direction as the PVA film 13 contracts in the direction of the elongation axis due to change in temperature or humidity. As the temperature resulting from the lamp rises very much, furthermore, the liquid crystal panel positioned on above the lamp is affected by the temperature and bends in a predetermined direction. The degree of bending of the liquid crystal panel becomes severer when the bending direction of the polarization plate 16 is identical to that of the liquid crystal panel.

FIG. 2 is a sectional view showing the bending direction of the liquid crystal panel and the upper and lower polarization plates according to the prior art. When the liquid crystal display according to the prior art is affected by temperature or humidity, the liquid crystal panel 30 bends in a predetermined direction and the upper and lower polarization plates 20 and 40 bends in directions opposite to each other. Consequently, any one of the upper and lower polarization plates 20 and 40 necessarily has the same bending direction as the liquid crystal panel 30. This adversely increases the degree of bending of the liquid crystal panel 30. It is difficult, in the end, to maintain uniform screen quality throughout the entire region of the liquid crystal panel 30. Although FIG. 2 shows a case wherein the bending direction of the upper polarization plate 20 is identical to that of the liquid crystal panel 30, the lower polarization plate 40 and the liquid crystal panel 30 may have the same bending direction (not shown) as mentioned above and the degree of bending of the liquid crystal panel 30 may become severer.

SUMMARY OF THE INVENTION

Accordingly, the present invention has been made to solve the above-mentioned problems occurring in the prior art, and an object of the present invention is to provide a liquid crystal display capable of maintaining uniform screen quality throughout the entire region of a liquid crystal panel by improving the bending phenomenon of the liquid crystal panel.

In order to accomplish this object, there is provided a liquid crystal display including a liquid crystal panel having upper and lower substrates bonded each other with a liquid crystal layer interposed between them; an upper polarization plate attached to the upper surface of the upper substrate; and a lower polarization plate attached to the lower surface of the lower substrate, wherein the upper and lower polarization plates have adhesion layers, respectively, which have different adhesion forces depending on the bending direction of the liquid crystal panel.

When the liquid crystal panel bends in such a manner that it is convex in the downward direction, the adhesion force of the adhesion layer of the lower polarization plate is larger than that of the adhesion layer of the upper polarization plate.

When the liquid crystal panel bends in such a manner that it is convex in the downward direction, the adhesion force of the first surface of the adhesion layer of the upper polarization plate facing the liquid crystal panel is smaller than that of the second surface thereof positioned opposite to the first surface and the adhesion force of the first surface of the adhesion layer of the lower polarization plate facing the liquid crystal panel is larger than the second surface thereof positioned opposite to the first surface.

When the liquid crystal panel bends in such a manner that it is convex in the upward direction, the adhesion force of the adhesion layer of the upper polarization plate is larger than that of the adhesion layer of the lower polarization plate.

When the liquid crystal panel bends in such a manner that it is convex in the upward direction, the adhesion force of the first surface of the adhesion layer of the upper polarization plate facing the liquid crystal panel is larger than that of the second surface thereof positioned opposite to the first surface and the adhesion force of the first surface of the adhesion layer of the lower polarization plate facing the liquid crystal panel is smaller than the second surface thereof positioned opposite to the first surface.

According to another aspect of the present invention, there is provided a liquid crystal display including a liquid crystal panel having upper and lower substrates bonded each other with a liquid crystal layer interposed between them; an upper polarization plate attached to the upper surface of the upper substrate; and a lower polarization plate attached to the lower surface of the lower substrate, wherein the upper and lower polarization plates have adhesion layers, respectively, which have different thicknesses depending on the bending direction of the liquid crystal panel.

When the liquid crystal panel bends in such a manner that it is convex in the downward direction, the thickness of the adhesion layer of the lower polarization plate is larger than that of the adhesion layer of the upper polarization plate.

When the liquid crystal panel bends in such a manner that it is convex in the upward direction, the thickness of the adhesion layer of the upper polarization plate is larger than that of the adhesion layer of the lower polarization plate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
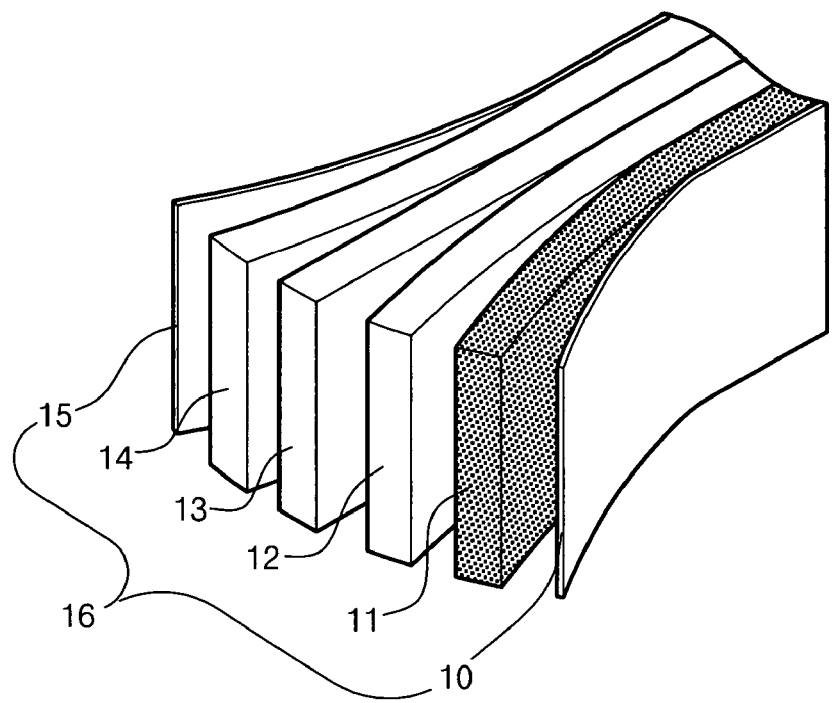
FIG. 1 is a perspective view showing the structure of a polarization plate according to the prior art.
Figure 2:
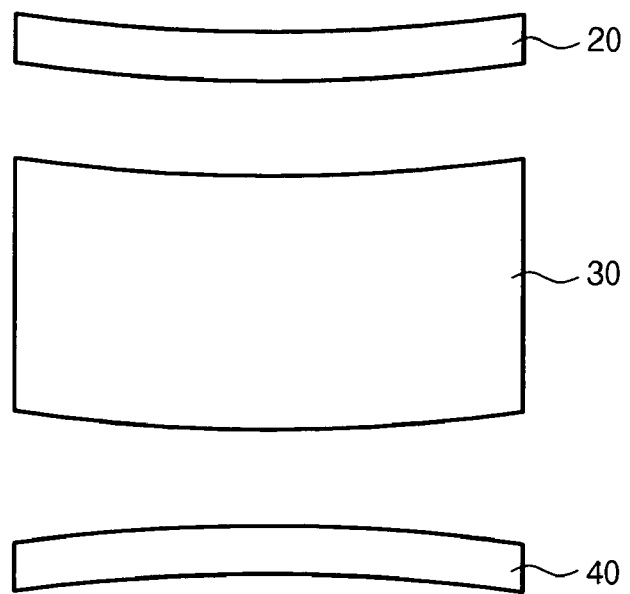
FIG. 2 is a sectional view showing the bending direction of a liquid crystal panel and upper and lower polarization plates according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
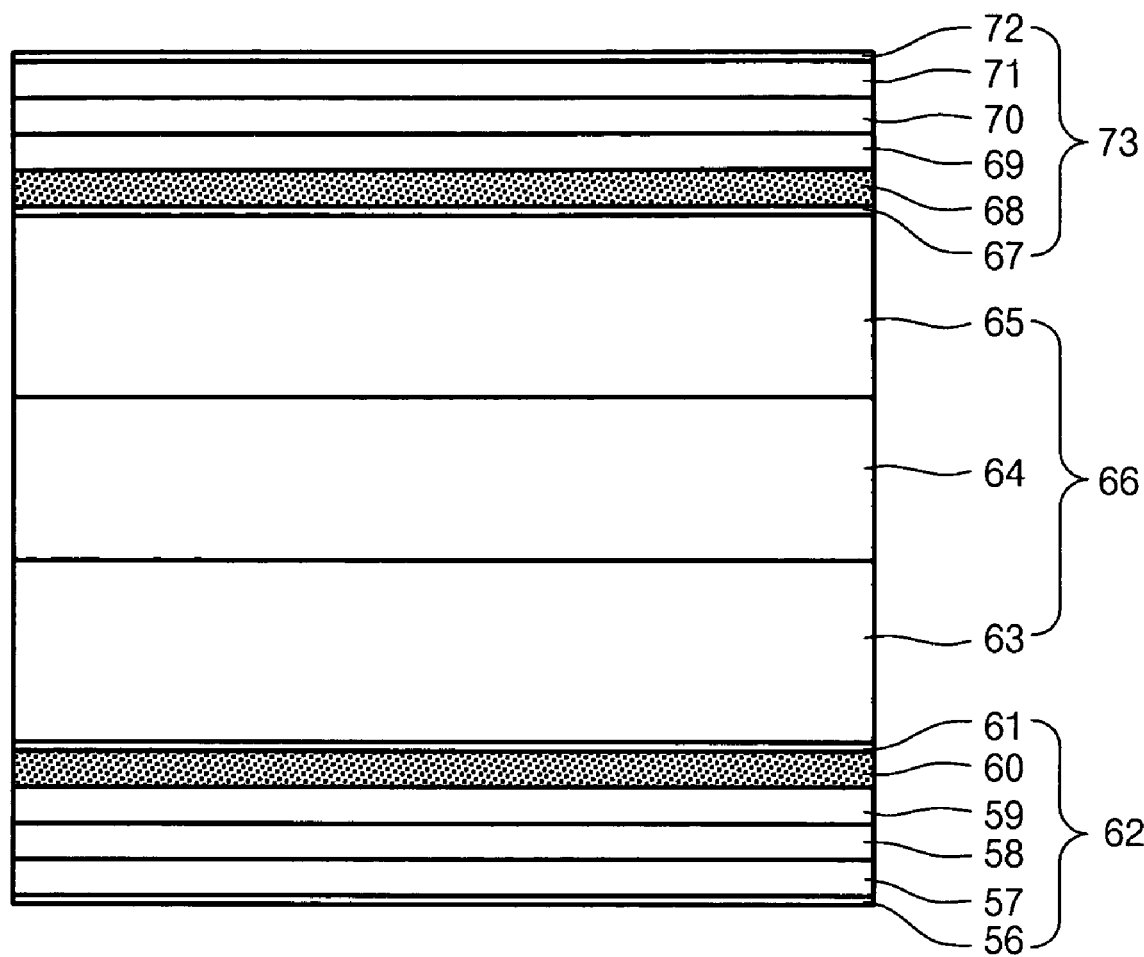
FIG. 3 is a sectional view showing a liquid crystal display according to a first embodiment of the present invention.

FIG. 3 is a sectional view showing a liquid crystal display according to a first embodiment of the present invention.

A liquid crystal display according to a first embodiment of the present invention, as shown in FIG. 3, includes a liquid crystal panel 66 and upper and lower polarization plates 73 and 62. The liquid crystal panel 66 has upper and lower substrates 65 and 63 bonded to each other with a liquid crystal layer 64 interposed between them. The upper and lower polarization plates 73 and 62 are attached to the upper and lower surfaces of the liquid crystal panel 66, respectively. The upper polarization plate 73 has an upper polarization plate adhesion layer 68, a first upper TAC film 69, an upper PVA film 70, a second upper TAC film 71, and an upper mold-release film 72 successively laminated. In a similar manner, the lower polarization plate 62 has a lower polarization plate adhesion layer 60, a first lower TAC film 59, a lower PVA film 58, a second lower TAC film 57, and a lower mold-release film 56 successively laminated.

The upper and lower PAV films 70 and 58 are elongated in a predetermined direction and are dyed with a pigment having two colors. The adhesion layers 68 and 60 of the upper and lower polarization plates are a high-molecular material having adhesion force so that the upper and lower polarization plates 73 and 62 are attached to the upper and lower substrates 65 and 63, respectively. When the liquid crystal display is affected by temperature or humidity, the liquid crystal panel 66 and the upper and lower polarization plates 73 and 62 bend in a predetermined direction. The adhesion layers 68 and 60 of the upper and lower polarization plates have different adhesion forces, depending on the bending direction of the liquid crystal panel 66.

Figure 4:
FIG. 4 is a sectional view showing the bending direction of a liquid crystal panel and upper and lower polarization plates according to a first embodiment of the present invention.
Figure 4:
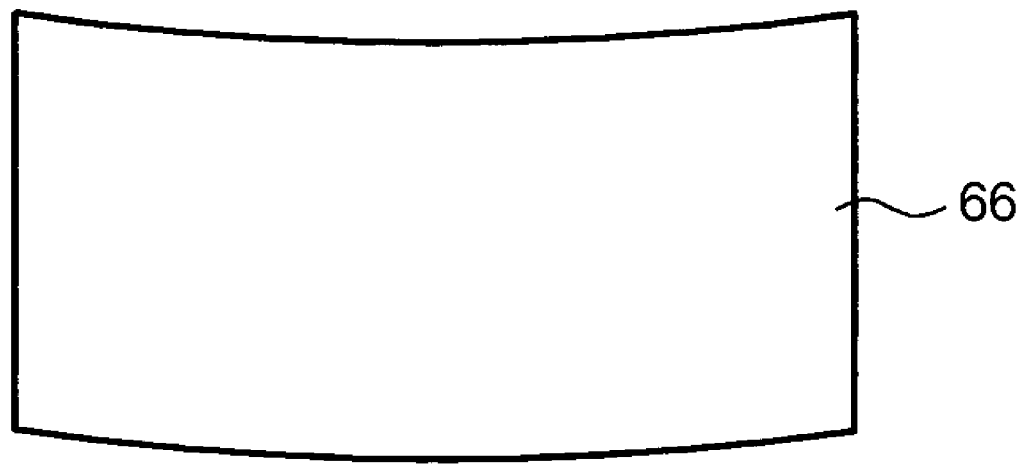
Figure 4:

FIG. 4 is a sectional view showing the bending direction of the liquid crystal panel and the upper and lower polarization plates according to the first embodiment of the present invention. When the liquid crystal panel 66 bends in such a manner that it is convex in the downward direction, the adhesion force of the adhesion layer 60 of the lower polarization plate is set to be larger than that of the adhesion layer 68 of the upper polarization plate so that, as shown in FIG. 4, the upper and lower polarization plates 73 and 62 bend in the opposite direction to the liquid crystal panel 66.

When the liquid crystal panel 66 bends in such a direction that it is convex in the downward direction, in addition, the adhesion force of the first surface of the adhesion layer 68 of the upper polarization plate facing the liquid crystal panel 66 is set to be smaller than the second surface thereof facing the first upper TAC film 69 and the adhesion force of the first surface of the adhesion layer 60 of the lower polarization plate facing the liquid crystal panel 66 is set to be larger than that of the second surface thereof facing the first lower TAC film 59 so that the upper and lower polarization plates 73 and 62 bend in the opposite direction to the liquid crystal panel 66.

When the liquid crystal panel 66 bends in such a manner that it is convex in the upward direction, although not shown in the drawing, the adhesion force of the adhesion layer 68 of the upper polarization plate is set to be larger than that of the adhesion layer 60 of the lower polarization plate so that the upper and lower polarization plates 73 and 62 bend in the opposite direction to the liquid crystal panel 66. When the liquid crystal panel 66 bends in such a direction that it is convex in the upward direction, in addition, the adhesion force of the first surface of the adhesion layer 68 of the upper polarization plate facing the liquid crystal panel 66 is set to be larger than the second surface thereof facing the first upper TAC film 69 and the adhesion force of the first surface of the adhesion layer 60 of the lower polarization plate facing the liquid crystal panel 66 is set to be smaller than that of the second surface thereof facing the first lower TAC film 59 so that the upper and lower polarization plates 73 and 62 bend in the opposite direction to the liquid crystal panel 66 and compensate for the bending direction of the liquid crystal panel 66. An upper adhesion protective film 67 may be interposed between the liquid crystal panel 66 and the adhesion layer 68 of the upper polarization plate and a lower adhesion protective film 61 may be interposed between the liquid crystal panel 66 and the adhesion layer 60 of the lower polarization plate.

Figure 5:
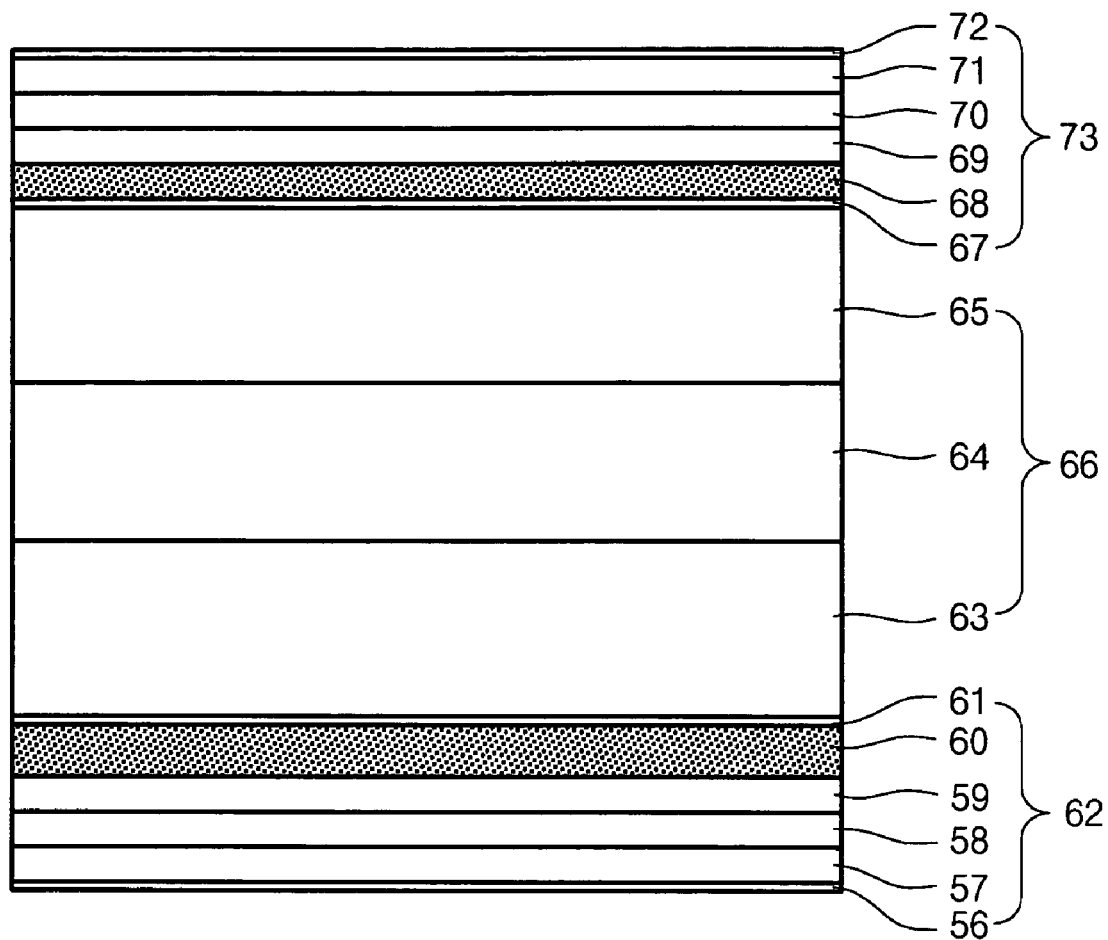
FIGS. 5-6 is a sectional view showing a liquid crystal display according to a second embodiment of the present invention.
Figure 6:
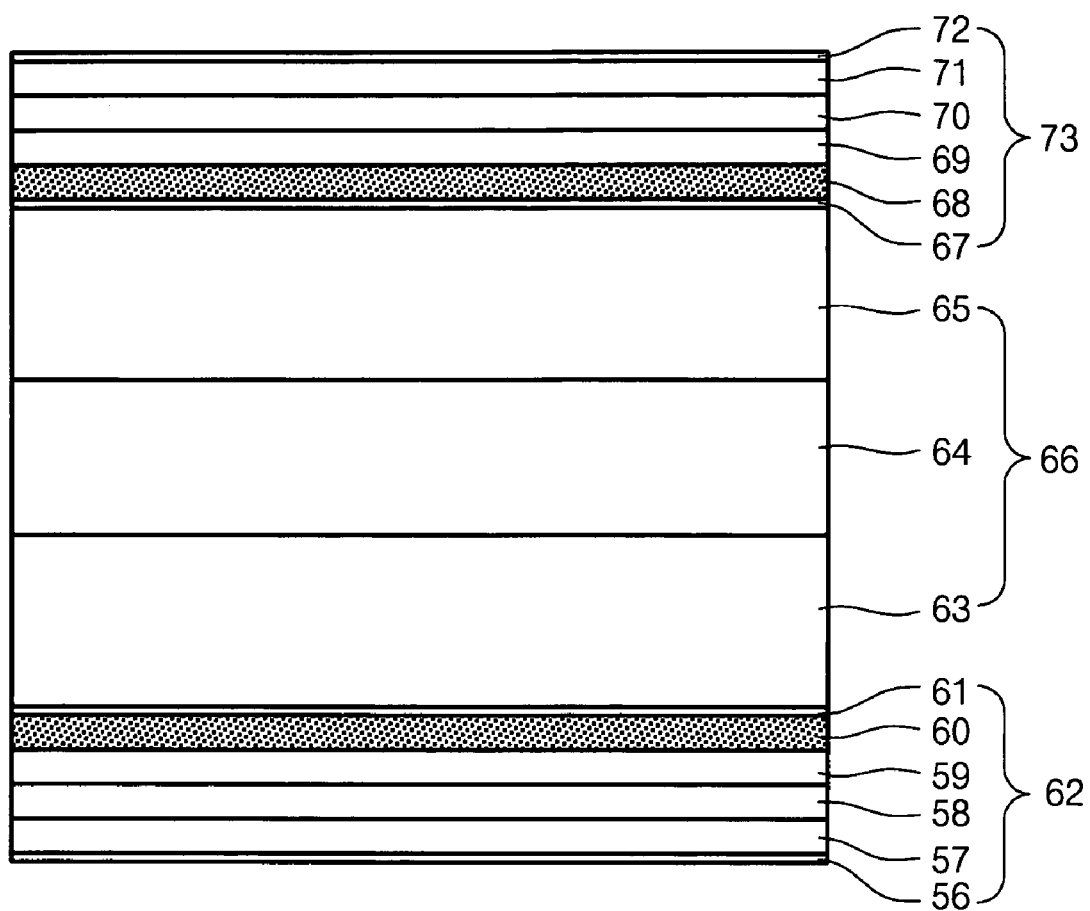

FIG. 5 is a sectional view showing a liquid crystal display according to a second embodiment of the present invention.

A liquid crystal display according to a second embodiment of the present invention has the same construction as the first embodiment of the present invention, except that the adhesion layers 68 and 60 of the upper and lower polarization plates have different thicknesses depending on the bending direction of the liquid crystal panel 66.

When the liquid crystal panel 66 bends in such a direction that it is convex in the downward direction, as shown in FIG. 5, the thickness of the adhesion layer 60 of the lower polarization plate is set to be larger than that of the adhesion layer 68 of the upper polarization plate so that the upper and lower polarization plates 73 and 62 bend in the opposite direction to the liquid crystal panel 66.

When the liquid crystal panel 66 bends in such a direction that it is convex in the upward direction, although not shown in the drawing, the thickness of the adhesion layer 68 of the upper polarization plate is set to be larger than that of the adhesion layer 60 of the lower polarization plate so that the upper and lower polarization plates 73 and 62 bend in the opposite direction to the liquid crystal panel 66 and compensate for the bending direction of the liquid crystal panel 66.

As mentioned above, the adhesion layers of the upper and lower polarization plates have different adhesion forces or thicknesses according to the present invention so that the bending direction of the liquid crystal panel is opposite to that of the upper and lower polarization plates. This compensates for the bending direction of the liquid crystal panel and improves the bending phenomenon of the liquid crystal panel. As a result, uniform screen quality can be maintained throughout the entire region of the panel.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:
    a liquid crystal panel having upper and lower substrates bonded each other with a liquid crystal layer interposed between them;
    an upper polarization plate attached to the upper surface of the upper substrate; and
    a lower polarization plate attached to the lower surface of the lower substrate, wherein
    the upper and lower polarization plates have adhesion layers, respectively, which have different adhesion forces depending on the bending direction of the liquid crystal panel.

2. The liquid crystal display as claimed in claim 1, wherein, when the liquid crystal panel bends in such a manner that it is convex in the downward direction, the adhesion force of the adhesion layer of the lower polarization plate is larger than that of the adhesion layer of the upper polarization plate.

3. The liquid crystal display as claimed in claim 1, wherein, when the liquid crystal panel bends in such a manner that it is convex in the downward direction, the adhesion force of the first surface of the adhesion layer of the upper polarization plate facing the liquid crystal panel is smaller than that of the second surface thereof positioned opposite to the first surface and the adhesion force of the first surface of the adhesion layer of the lower polarization plate facing the liquid crystal panel is larger than the second surface thereof positioned opposite to the first surface.

4. The liquid crystal display as claimed in claim 1, wherein, when the liquid crystal panel bends in such a manner that it is convex in the upward direction, the adhesion force of the adhesion layer of the upper polarization plate is larger than that of the adhesion layer of the lower polarization plate.

5. The liquid crystal display as claimed in claim 1, wherein, when the liquid crystal panel bends in such a manner that it is convex in the upward direction, the adhesion force of the first surface of the adhesion layer of the upper polarization plate facing the liquid crystal panel is larger than that of the second surface thereof positioned opposite to the first surface and the adhesion force of the first surface of the adhesion layer of the lower polarization plate facing the liquid crystal panel is smaller than the second surface thereof positioned opposite to the first surface.

6. A liquid crystal display comprising:
    a liquid crystal panel having upper and lower substrates bonded each other with a liquid crystal layer interposed between them;
    an upper polarization plate attached to the upper surface of the upper substrate; and
    a lower polarization plate attached to the lower surface of the lower substrate, wherein
    the upper and lower polarization plates have adhesion layers, respectively, which have different thicknesses depending on the bending direction of the liquid crystal panel.

7. The liquid crystal display as claimed in claim 6, wherein, when the liquid crystal panel bends in such a manner that it is convex in the downward direction, the thickness of the adhesion layer of the lower polarization plate is larger than that of the adhesion layer of the upper polarization plate.

8. The liquid crystal display as claimed in claim 6, wherein, when the liquid crystal panel bends in such a manner that it is convex in the upward direction, the thickness of the adhesion layer of the upper polarization plate is larger than that of the adhesion layer of the lower polarization plate.

* * * * *